United States Patent [19]

Milner

[11] Patent Number: 5,269,849
[45] Date of Patent: Dec. 14, 1993

[54] APPARATUS AND METHOD FOR REDUCING LUMP FORMATION AND CRYSTAL IMPACT DAMAGE IN A SUGAR CENTRIFUGAL

[75] Inventor: Ted D. Milner, Westminster, Colo.

[73] Assignee: Silver-Weibull, Aurora, Colo.

[21] Appl. No.: 904,108

[22] Filed: Jun. 25, 1992

[51] Int. Cl.⁵ .................... C13F 1/06; B01D 35/00
[52] U.S. Cl. .......................... 127/2; 127/17; 127/19; 127/56; 210/369; 210/781; 210/360.2; 494/56
[58] Field of Search .................... 127/2, 17, 19, 56; 210/781, 360.2, 369; 494/56

[56] References Cited

U.S. PATENT DOCUMENTS 4,008,098  2/1977  Dietzel et al. .................... 127/56

Primary Examiner—R. Bruce Breneman
Assistant Examiner—P. L. Hailey
Attorney, Agent, or Firm—Robert F. Palermo

[57] ABSTRACT

An apparatus and method for reducing sugar, crystal impact damage and lump formation in a sugar centrifugal includes a resilient deflector ring which absorbs most of the impact energy of the crystals while deflecting the crystals out of the path of trailing high speed crystals. An air flow parallel to the local surface of the deflector ring causes vibration of the deflector ring to reduce the tendency for crystals to stick while addition of a supply of water aspirated and atomized by the air flow maintains the ring surface free of syrup build-up which could cause crystals to adhere to the ring surface and form lumps.

6 Claims, 3 Drawing Sheets

APPARATUS AND METHOD FOR REDUCING LUMP FORMATION AND CRYSTAL IMPACT DAMAGE IN A SUGAR CENTRIFUGAL

BACKGROUND OF THE INVENTION

This invention relates generally to sugar centrifugals and more particularly to devices and methods for achieving improvements in continuous sugar centrifugals which provide reduced lump formation together with a virtual elimination of crystal impact damage.

Massecuite is separated into sugar crystals and molasses (or run-off), its two components, through several operations. In cases where high-grade sugar crystals are being separated, the quality and integrity of the crystals after separation is of great importance. Broken crystals require downgrading of sugar product, and they must, therefore, be avoided. However, the viscosity of the molasses component of the massecuite requires centrifugal separation in order to free the sugar crystals from the surrounding syrup. The high discharge velocity and resultant high gravity forces imposed on the massecuite by the centrifugals frequently results in excessive damage to the high grade crystals due to high velocity impact with the bare wall of the sugar housing and with other crystals which reach the wall earlier. This crystal damage promotes lump formation, may require shutdown of the centrifugal for removal of lump build-up. Another contributor to lump formation is a build-up of a syrup film on the surface on which the crystals impact when discharged from the centrifuge basket. The film results from the extremely small fraction of the molasses which remains on the sugar crystals after centrifuging. Especially in the case of continuous centrifugals, over a long operating time, the syrup film can become quite thick and sticky. This makes lump formation increasingly likely, thereby limiting the economic benefit of continuous operation.

Since crystal damage and lump formation are more pronounced in continuous centrifugals than they are in batch type centrifugals beyond some threshold running time, continuous operation does not achieve its full potential of improved production efficiency for high grade sugar. Therefore, it is very important to operate continuous centrifugals in such a manner and to provide such features as will minimize, if not eliminate, crystal damage and lump formation to improve performance in continuous centrifugals.

Efforts to avoid such damage and the attendant economic losses have included reduction of basket rotary speed, which reduces crystal/molasses separation efficiency, and provision of a deflecting shock absorber designed to cushion crystal impact with the sugar housing and to deflect the crystals out of the path of trailing crystals to prevent crystal-to-crystal impact damage and lump formation and build up. The deflector is also capable of air-induced vibration to prevent sticking by the impinging crystals. The deflector/vibrator is more fully disclosed in U.S. patent application Ser. No. 07/808,415, filed Dec. 13, 1991 and commonly assigned by the inventor herein. These efforts have improved performance of sugar centrifugals, but they have not fully eliminated crystal breakage and lump formation. Particularly in continuous centrifugals, some lump formation and breakage persists. Because of continuous operation, a significant deposit of syrup may form, over time, on the surface of the deflector/shock absorber. This may retard sloughing of the first-arriving crystals so that they are struck by following crystals and mutually damaged. Lump formation begins with the earliest crystal damage and continues at an increasing rate during operation. The aggravating effects of continuous operation are therefore expected.

Reduction of speed of the centrifugal results in a reduction of throughput without completely eliminating crystal breakage even when crystal separation is assisted by differential air pressure through the centrifugal basket as disclosed in U.S. patent application Ser. No. 07/806,521, filed Dec. 13, 1991 and commonly assigned by the inventor herein. Although improved performance is achieved using differential air pressure, the ultimate aim of lump-free undamaged crystals is still not realized.

Another approach to minimizing crystal damage was disclosed in U.S. patent application Ser. No. 07/807,284, filed Dec. 13, 1991 and also commonly assigned by the inventor herein. In this case, the effective centrifugal speed was reduced by providing a crystal release ring having a diameter significantly less than that of the upper shroud ring of the centrifugal basket. This reduced the tangential velocity of the crystals at their point of release from the basket and, thereby reduced impact energy and resultant damage to the crystals. Again, although crystal damage and lump formation were reduced, they still occurred to an undesirable extent for high grade sugar production.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus and method for reducing sugar crystal impact damage and lump formation in a sugar centrifugal including a shock absorbing deflector ring extending downwardly from the top surface of a sugar housing to a height lower than the top edge of a concentric centrifugal basket rotatably mounted within the deflector ring; a provision for sloughing sugar crystals from the deflector ring; and another provision of retarding build-up of a syrup film on the deflector ring.

The foregoing and other aspects will become apparent from the following detailed description of the invention when considered in conjunction with the accompanying drawing figures.

DETAILED DESCRIPTION

Figure 1:
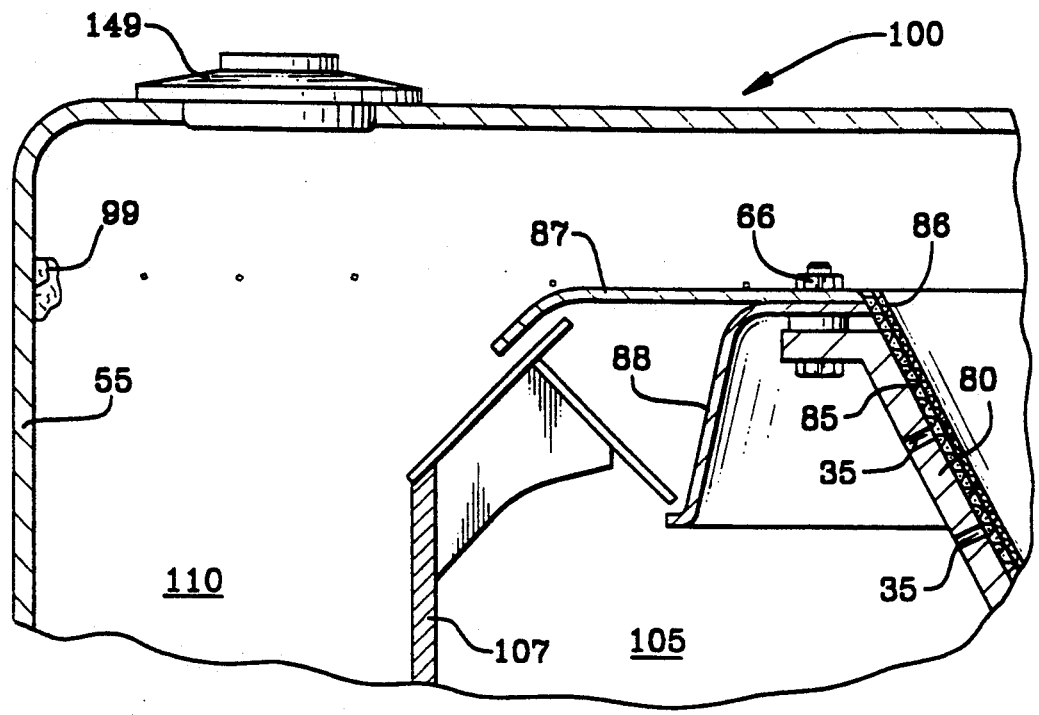
FIG. 1 is a fragmentary partially sectional schematic view illustrating a portion of the discharge region of a typical sugar centrifugal of the prior art.

FIG. 1 schematically illustrates features of a typical sugar centrifugal. Basket 80 has drain holes 35 and spins at high speed. Massecuite within the basket separates into sugar crystals, which travel upward on fine working screen 86, and molasses, which drains through fine working screen 86, back-up screen 85 and basket drain holes 35 into molasses chamber 105. The sugar crystals pass over the rim of the basket and slide across upper shroud 87 from which they are slung outwardly to sugar housing 55. Some crystal damage may result from impact with housing 55 or with other crystals. In addition to crystal breakage due to impact, pile-up of broken crystals promotes formation of lump 99.

Crystals, and portions of lump 99 which periodically separate from sugar housing 55, fall into sugar chamber 110 which is separated from molasses chamber 105 by chamber wall 107. Handhole cover 149 provides visual inspection access to sugar chamber 110 of sugar housing 55.

Figure 2:
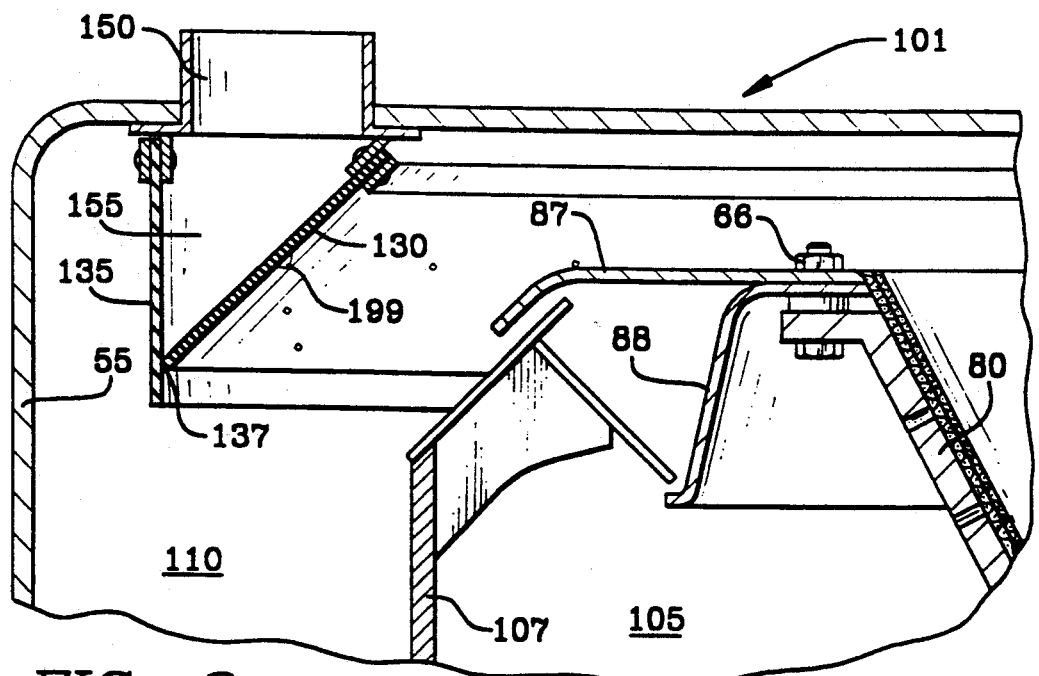
FIG. 2 is a fragmentary partially sectional schematic view, as in FIG. 1, illustrating some improvements described earlier incorporated in a sugar centrifugal.

FIG. 2 is a schematic view illustrating some improvements described earlier and incorporated in a sugar centrifugal. In all respects, except for incorporation of those features, the features of the centrifugal are the same as described for FIG. 1. The improvement provides for a shock absorbing structure which is interposed between the outer edge of upper shroud 87 and sugar housing 55 so that crystals, as they are slung outwardly from the shroud, collide first with inner member 130 which is a truncated conic surface suspended from the sugar housing top and surrounding basket 80. Member 130 has a larger diameter at the bottom than the top and is made of a resilient material such as rubber or another soft polymer. Thus, it deflects crystals downwardly and also absorbs much of their kinetic impact energy. The crystals, so deflected, are diverted from the high energy impact area of the trailing crystals and are thus spared those potentially damaging collisions. This diversion also reduces the tendency to form lumps by dispersing the damp crystals and slowing them, so they dry a bit more, as described below, than they otherwise would, before depositing them in the sugar chamber 110. Outer member 135 also suspended from the sugar housing top is concentric with inner member 130 and may also be made from a resilient polymeric or elastomeric material. The lower edge of inner member 130 contacts outer member 135 forming an annular plenum 155 of triangular cross section against the sugar housing top. The lower edge of outer member 135 extends well below its line of intersection with inner member 130, so that sugar crystals which miss, or are deflected shallowly by member 130 may be re-deflected to sugar chamber 110 by member 135.

Annular plenum 155 subtends the portion of the sugar housing top which includes ventilation pipe 150. When air is forced from pipe 150 into plenum 155, it finally escapes through the unsealed contact line 137 between inner member 130 and outer member 135. Air flow through line 137 causes fluttering or vibration of both members which causes crystals, which may tend to stick to the two members and form lumps 199, to fall freely into sugar chamber 110. This air flow also contributes to added drying of the dispersed sugar crystals as they encounter the air stream below line 137, which further reduces lump forming tendencies.

This reduces sugar crystal impact damage by providing shock-absorbing targets against which the crystals are slung by the centrifugal basket; by deflecting crystals downwardly from the targets so that trailing crystals rarely make high speed impacts against leading crystals; and by reducing sticking of crystals to the shock-absorbing targets, thereby reducing high speed impacts against stuck leading crystals by trailing crystals. Lump 199 formation is decreased primarily by the deflection of crystals by the shock absorbing members and by the fluttering or vibration of those members which is caused by air flow from the plenum through the contact line between the inner and outer members. This air flow also reduces moisture content which further discourages lump formation. However, despite the reduction in crystal damage and lump formation, there is still room for significant improvement in quality of sugar output especially from continuous centrifugals.

Figure 3:
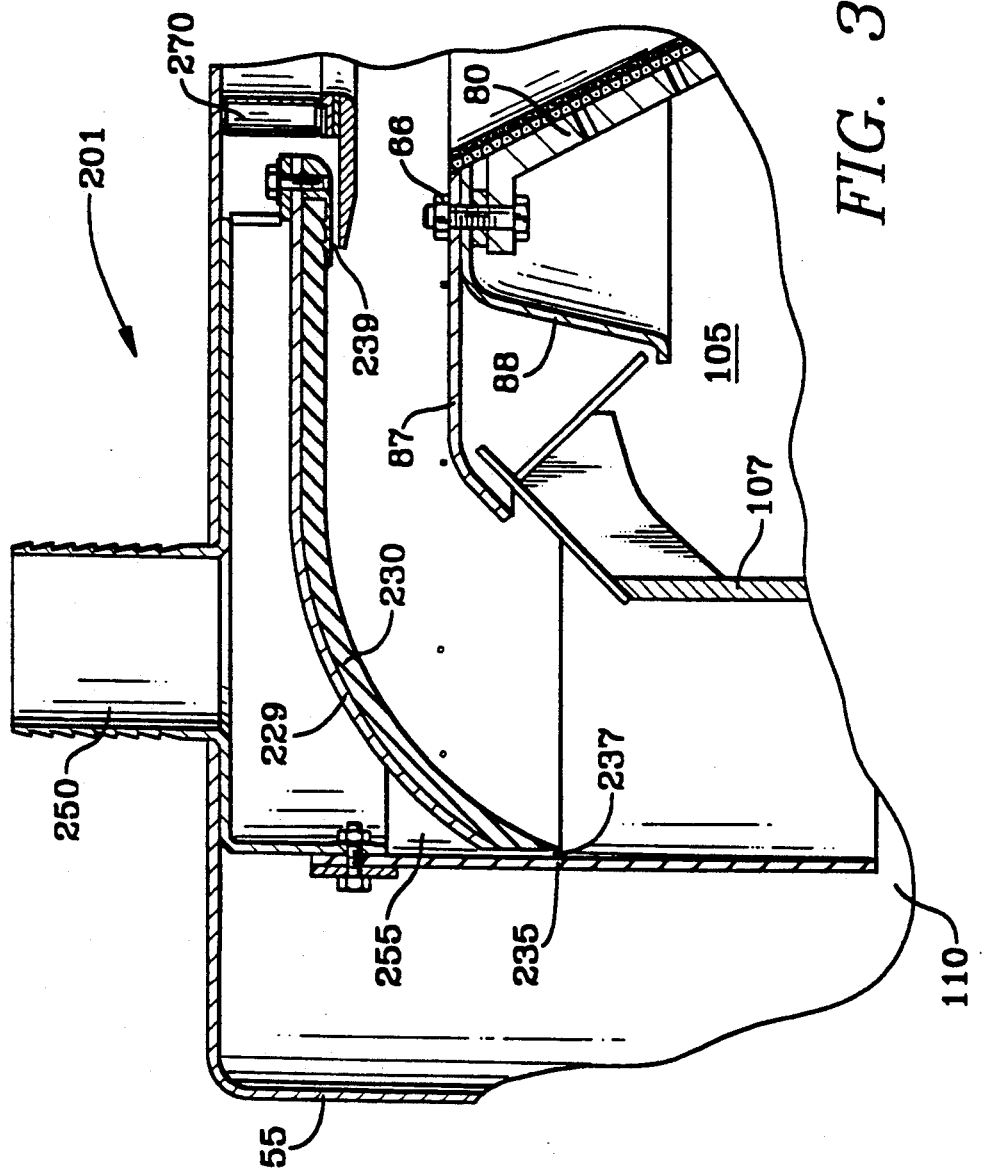
FIG. 3 illustrates a preferred embodiment of the crystal saving features of the present invention.
Figure 4:
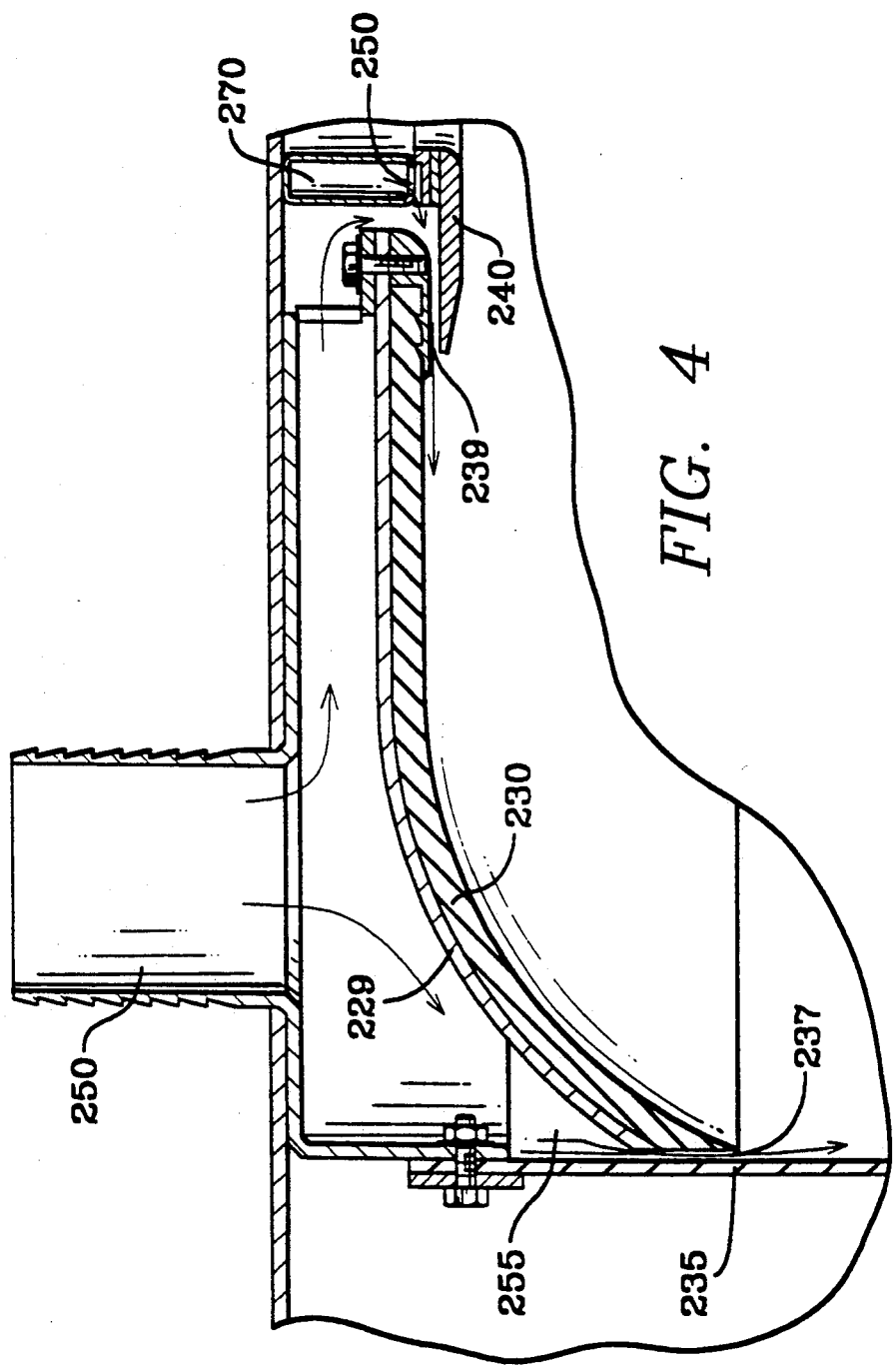
FIG. 4 is an enlarged view of the present invention showing further details of its operation.

By considering FIGS. 3 and 4, the preferred embodiment of the present invention will be readily understood. FIG. 4 is an enlarged view of the key portion of FIG. 3 in which operating features are more readily seen. Note that like features have the same numbers in both Figs., and only those features which are different will be discussed.

The sugar centrifugal 201 is shown with a typical centrifuge basket 80, sugar housing 55, sugar chamber 110, chamber wall 107, and molasses chamber 105. The shock-absorbing deflector ring of the present invention is made up of substantially cylindrical outer flexible ring 235, inner bowl-edged ring 229 which is coated by flexible layer 230 on its crystal impact side, compressed air plenum 255, compressed air injection nozzle 250, air slot 237, air/water slot 239 and slot cover 240, and water conduit 270 which has a plurality of slot shaped nozzles 275.

The flexible or resilient layer 230 on deflector ring 229 cushions the impact of impinging sugar crystals and deflects them downward to sugar chamber 110. A small fraction of the minute quantity of molasses retained on the crystals is deposited on the surface of layer 230. Most crystals fall free of the ring due to the vibration caused by flow of compressed air through air slots 237 and 239. Because of the molasses build-up on the ring, crystals will eventually begin to stick to the ring and to form lumps unless water is injected through conduit 270. The water flows out through slotted nozzles 275 above slot cover 240 where it is aspirated into the flow of compressed air from plenum 255 and passes through air/water slot 239 as atomized liquid which strikes ring surface 230 at a substantially parallel angle to moisten the surface and keep it slippery to the crystals so there is no build-up of a syrup or molasses film. The bowl-edged configuration of deflector ring 229/230 is important so that the atomized mist travels smoothly along the surface and is not deflected away. This distributes the mist uniformly over the whole ring 229/230 surface so there is no tendency to form sticky spots where lumps could begin to form.

The provision of a bowl-edged deflector ring and water injection into the compressed air plenum for aspiration and atomization by the compressed air, and the locally parallel introduction of mist to the deflector ring surface provides the required additional improvement to permit high grade sugar production in continuous centrifugals.

What is claimed is:

1. An apparatus for reducing sugar crystal impact damage and lump formation in a sugar centrifugal, comprising:

deflector ring means for absorbing crystal impact energy, said means extending in a downward direction, from a top surface of a sugar housing, to a point located below a top edge of a concentric centifugal basket rotatably mounted within said deflector ring;

means for sloughing sugar crystals from said deflector ring means, said means for sloughing comprising compressed air injector means for directing a stream of air downwardly through an annular slot defined by the convergence of two members of said deflector ring means, thereby producing vibration in said two members and sloughing adherent sugar crystals therefrom; and means for retarding a build-up of syrup on said deflector ring means.

2. The apparatus of claim 1, wherein the deflector ring means comprises one substantially cylindrical flexible member and one bowl-edged ring member mounted concentrically outside the top edge of the centrifugal basket, said bowl-edged ring member being mounted within, and converging radially outwardly and downwardly to approach contact with, said substantially cylindrical flexible member.

3. The apparatus of claim 1, wherein the means for retarding a built-up of syrup on said deflector ring means comprises an annular air distribution plenum mounted above said deflector ring means, said plenum receiving compressed air from a nozzle through the top surface of the sugar housing and discharging said compressed air through slots at the radially inner and outer edges of an outwardly and downwardly sloping ring member of said deflector ring means, both slots being oriented such that the discharged air travels substantially parallel to the surface of said sloping ring member; an annular water conduit positioned concentrically within the slot at the radially inner edge of said annular plenum, said water conduit having a plurality of nozzles directed radially outwardly such that said compressed air entrains and atomizes the water and intensifies its solvent action upon any syrup coating the crystals or deposited on said radially downward sloping ring member.

4. The apparatus of claim 1, wherein said means for retarding a build-up of syrup on said deflector ring means comprises:

an annular water conduit positioned concentrically within a slot at the radially inner edge of said deflector ring means, said water conduit having a plurality of nozzles directed radially outwardly from said slot in conjunction with compressed air nozzles such that said compressed air entrains and atomizes the water and intensifies its solvent action upon any syrup coating the crystals or deposited on said deflector ring means.

5. In a sugar centrifugal of the type having a cylindrical housing with a central centifuge basket, a molasses chamber surrounding said centrifuge basket, and a sugar chamber surrounding said molasses chamber, the improvement, in combination therewith, comprising:

deflector ring means for absorbing crystal impact energy, said means extending in a downward direction, from a top surface of said sugar housing, to a point located below a top edge of said centrifuge basket, said deflector ring means comprising one substantially cylindrical flexible member and one bowl-edged ring member mounted concentrically outside the top edge of the centrifuge basket, said bowl-edged ring member being mounted within, and converging downwardly to approach contact with, said substantially cylindrical flexible member;

means for injecting and for directing a stream of compressed air downwardly through an annular slot defined by the convergence of two members of said deflector ring means to produce vibration in the components of the deflector ring means; and annular water conduit means, associated with a compressed air injection slot and positioned inwardly, radially adjacent, and concentric with said deflector ring means, said water conduit means further having a plurality of nozzles directed radially outwardly through said compressed air injection slot and substantially parallel with an adjacent lower surface of the bowl-edged ring member for rinsing said surface to retard formation of a syrup film on said deflector ring means.

6. A method for reducing lump formation and crystal impact damage in a sugar centrifugal, comprising:

providing flexible deflector ring means for absorbing crystal impact energy, for receiving sugar crystals from a centrally mounted centrifuge basket, and for deflecting said crystals downwardly and out of the impact path of following crystals;

directing compressed air across and parallel to the local surface of the deflector ring means through slots adjacent to inner and outer edges of said deflector ring means to sweep and to produce vibration in said deflector ring means; and injecting water adjacent to said inner edge of the deflector ring means, said water being entrained and atomized by the flow of compressed air and providing limited solvent action for maintaining the surface of said deflector ring means free of syrup build-up.

* * * * *